United States Patent [19]

Ishikawa et al.

[11] 4,207,971
[45] Jun. 17, 1980

[54] RUST PREVENTING DEVICE FOR A ROTOR OF A DISC BRAKE

[75] Inventors: Masakazu Ishikawa; Hiroyuki Oka; Juichi Shibatani; Yuichiro Obu, all of Toyota, Japan

[73] Assignee: Toyota Jidosha Kogyo Kabushiki Kaisha, Toyota, Japan

[21] Appl. No.: 768,697

[22] Filed: Feb. 14, 1977

[30] Foreign Application Priority Data

Sep. 2, 1976 [JP] Japan .................. 51-116950[U]

[51] Int. Cl.² .............................................. F16D 63/00
[52] U.S. Cl. ...................................... 188/218 A; 422/8
[58] Field of Search .............. 188/71.1, 218 A, 264 A, 188/264 AA, 1, 2 R; 192/112; 220/64; 106/1, 14; 21/2.5 B; 422/8, 10

[56] References Cited

U.S. PATENT DOCUMENTS

| | | | |
|---|---|---|---|
| 2,588,665 | 3/1952 | Sinclair | 188/218 A |
| 2,630,368 | 3/1953 | Wachter et al. | 21/2.5 B |
| 2,746,577 | 5/1956 | Butler | 188/218 A |
| 2,895,270 | 7/1959 | Blaess | 21/2.5 B |
| 3,161,249 | 12/1964 | Bouladon et al. | 188/264 A |
| 3,213,976 | 10/1965 | Yost et al. | 188/218 A |
| 3,433,577 | 3/1969 | Shick | 21/2.5 B |
| 3,530,569 | 9/1970 | Wilson | 106/14 |
| 3,901,836 | 8/1975 | Kader | 106/14 |
| 4,005,768 | 2/1977 | Bubnash et al. | 188/218 A |

FOREIGN PATENT DOCUMENTS

2626338  12/1976  Fed. Rep. of Germany ...... 188/218 A
 312138   5/1929  United Kingdom ................ 188/218 A
1244599   9/1971  United Kingdom ................... 188/71.1

OTHER PUBLICATIONS

*Volatile Rust Inhibitors*, Surface Chemistry Branch Chem. Div., Naval Research Lab., Mar. 10, 1954.
*A Rust and Corrosion Preventing Material Traders Directory*, "Volatile Rust Preventing Papers"; Volatile Corrosion Inhibitor 'Diane', pp. 128,144, Feb. 25, 1974.

*Primary Examiner*—Edward R. Kazenske
*Attorney, Agent, or Firm*—Stevens, Davis, Miller & Mosher

[57] ABSTRACT

A rust preventing device for keeping a rotor of a disc brake from rusting. The rotor has an inner surface and an outer surface covered by a dust shield. The inner surface of the rotor is covered by a rust preventing cover. The rust preventing cover is secured to the dust shield in a snapping manner.

2 Claims, 10 Drawing Figures

RUST PREVENTING DEVICE FOR A ROTOR OF A DISC BRAKE

DESCRIPTION OF THE INVENTION

The present invention relates to a rust preventing device for a rotor of a disc brake for use in a vehicle. The rotor of the disc brake is apt to easily rust since the disc brake rotor is usually made of a cast iron. This particular problem often occurs when manufactured vehicles are transported by ships to a foreign country, wherein said vehicles are left standing on the docks for a while. Consequently, during this interim, since the vehicles are exposed to a salty atmosphere, there are many chances for the disc brake rotor to become rusty. Because of the rusted rotor, wear of the rubbing pad of the disc brake is promoted, and thus the coefficient of friction existing between the rubbing pad and the rotor is reduced, whereby a problem of reduced braking ability is created. In order to keep the rotor from rusting, it is possible to perform a rust preventing treatment on the surface of the rotor. However, applying rust preventive onto the surface of the rotor also produces a decrease in the braking ability of the vehicle because the existent coefficient of friction is reduced. Consequently, if the vehicle is delivered to the consumer with the rust preventive left on the surface of the rotor, then it becomes very dangerous for the consumer to drive the vehicle because of a decrease in the braking ability of the vehicle caused by the rust preventive. On the other hand, if the rust preventive substance is removed before the vehicle is delivered to the consumer, the problem of a rusting rotor may occur. For these reasons, usually it is impossible to apply the rust preventive to the rotor.

An object of the present invention is to provide a rust preventing device capable of keeping the rotor from rusting especially during the time of transit, without affecting the braking ability of the vehicle.

According to the present invention, there is provided a device for preventing a rotor of a disc brake of a vehicle from rusting, comprising, a rotor of a disc brake for a wheel of a roadway vehicle, said rotor having an outer surface adapted to be exposed to the roadway and an inner surface located opposite to said outer surface, a stationary dust shield covering said outer surface of said rotor and having an outer periphery extending radially beyond an outer periphery of said rotor, and a covering means removably secured to said dust shield and covering said inner surface of said rotor for shielding said inner and outer surfaces of said rotor from the atmosphere. The above-mentioned object of the present invention may be more fully understood from the following descriptions of preferred embodiments of the invention, together with the accompanying drawings.

DESCRIPTION OF PREFERRED EMBODIMENTS

Figure 1:
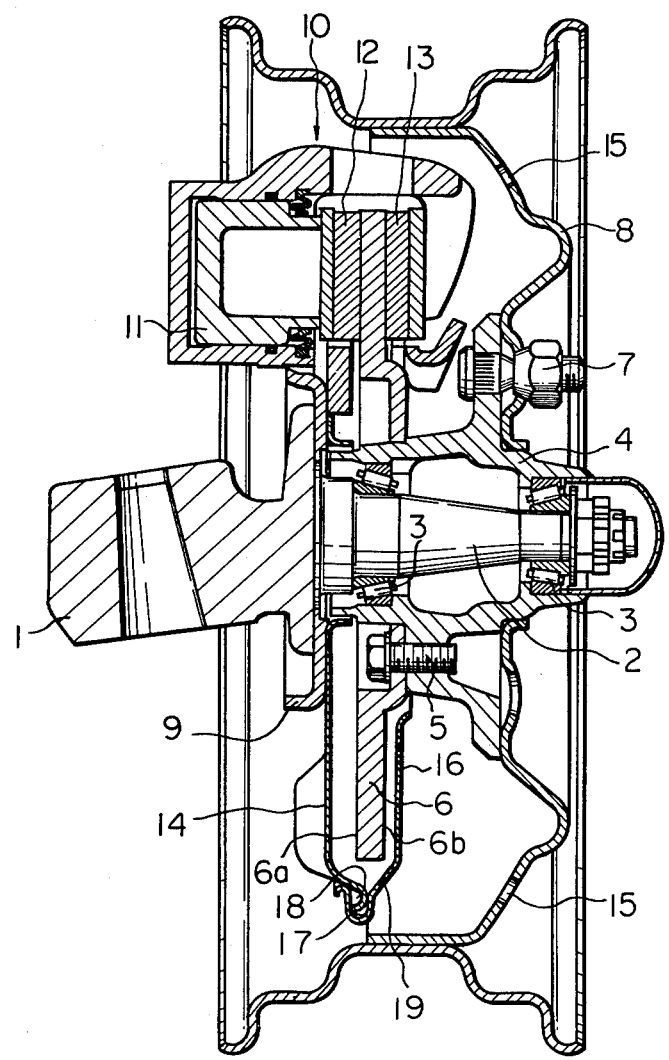
FIG. 1 is a cross-sectional view of a front wheel equipped with a rust preventing cover according to the present invention.

Referring to FIG. 1, which shows a cross-sectional view of a front wheel of a vehicle, a front wheel comprises a knuckle 1, a shaft 2 fixed to the knuckle 1, a hub 4 rotatably supported on the shaft 2 via bearings 3, a rotor 6 fixed to the hub 4 by means of bolts 5, a wheel 8 fixed to the hub 4 by means of bolts 7, a caliper support 9 fixed to the knuckle 1, and a caliper designated in general by reference numeral 10 and fixed to the caliper support 9. The caliper 10 comprises a piston 11 movable within the caliper 10, a rubbing pad 12 fixed onto the piston 11, and a rubbing pad 13 fixed onto the caliper 10. The braking operation is effected by clamping down the rotor 6 between the rubbing pads 12 and 13. Fixed onto the caliper support 9 is a dust shield 14 which is arranged so as to face the outer surface 6a of the rotor 6 so that the dust shield 14 covers the outer surface 6a of the rotor 6. This dust shield 14 serves to prevent dust from sticking onto the surface of the rotor 6. Usually, at atmosphere introducing hole 15 is formed on the wheel 8 for cooling the disc brake. Consequently, if the vehicle is left on the dock, for example, during the time of transit, the salty atmosphere is directly introduced onto the rotor surface, particularly the inner surface 6b of the rotor 6 via the atmosphere introducing hole 15, as a result of this, the rotor surface becomes rusty.

Figure 2:
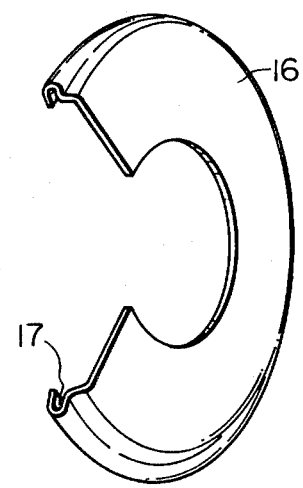
FIG. 2 is a perspective view of a rust preventing cover according to the present invention.

In order to avoid this problem, according to the present invention, there is provided a cover 16 which is arranged to face the inner surface 6b of the cover 6 at a small distance so that the cover 16 covers the inner surface 6b of the rotor 6. As shown in FIG. 2, this cover 16 is formed in an annular shape, and a part of the cover 16 corresponding to the caliper 10 is cut off. The cover 16 is continuously attached the disc brake until the time of the completed delivery of the vehicle to the receiver. Accordingly, it is preferable that the cover 16 be easily attachable and removable, and that the manufacturing cost of the cover 16 be low and the weight of the cover 16 be light. Taking these points into consideration, the cover 16 is made of synthetic resin such as vinyl chloride, polyethylene and polypropylene, or made of paper. In addition, the cover 16 has a construction such that the cover 16 can be easily attached and removed in such a way that the inner peripheral groove 17 formed along the outer edge of the cover 16 is fitted onto the trough-shaped outer periphery of the dust shield 14 (see FIG. 1) in a snapping manner. Since there is the danger that rain water and the like may enter into the inside of the cover 16, it is therefore preferable that the cover 16 be provided with a drainage hole 19 (see FIG. 1).

As aforementioned, because the cover 16 is made of synthetic resin or paper, there is a danger that the cover 16 may be deformed. Consequently, a number of ribs 20 may be formed on the surface of the cover 16 as shown in FIG. 3, thereby increasing the rigidity of the cover 16.

In a case where it is impossible to keep the rotor 6 from rusting only by attaching the cover 16 to the disc brake, it is possible to soak the cover 16 made of a sheet with a volatile rust preventive. Furthermore, it is also possible to attach a sheet containing a volatile rust preventive therein onto the inner surface of the cover 16 made of synthetic resin.

Figure 3:
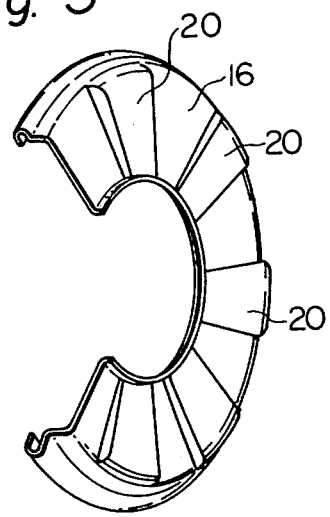
FIG. 3 is a perspective view of another embodiment of FIG. 2.
Figure 4:
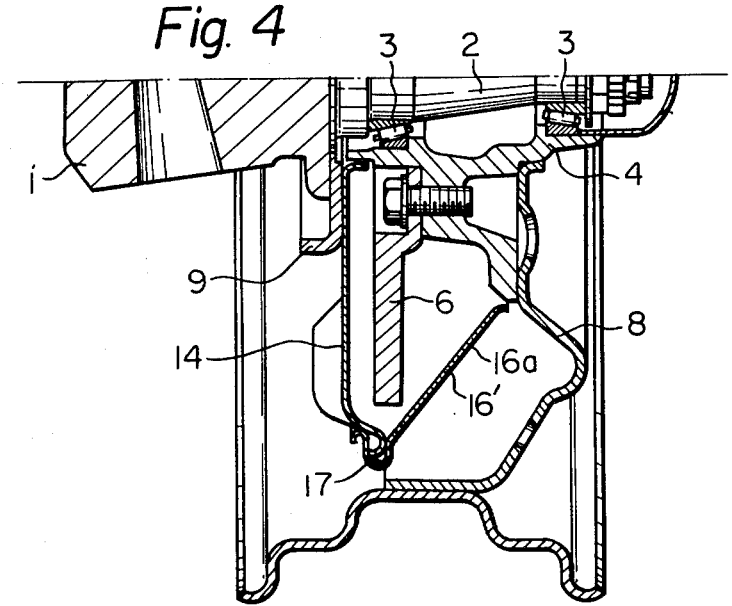
FIG. 4 is a cross-sectional view of another embodiment of FIG. 1.
Figure 5:
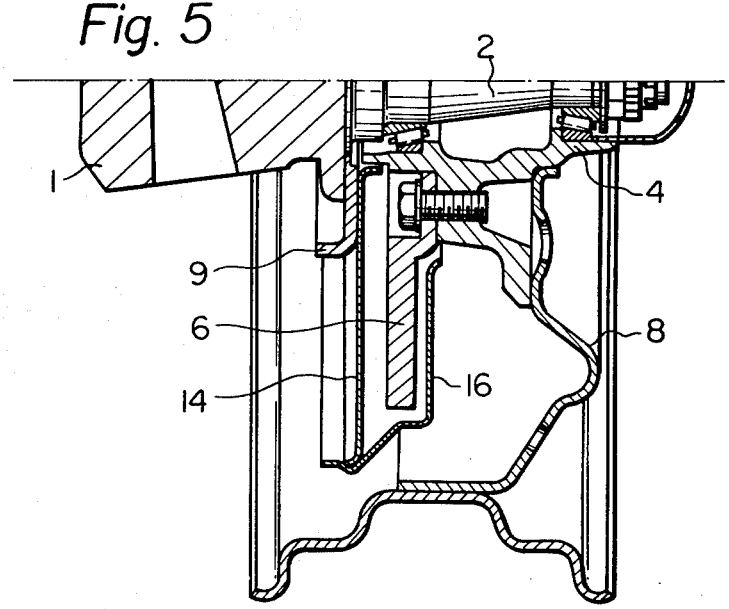
FIG. 5 is a cross-sectional view of a further embodiment of FIG. 1.
Figure 6:
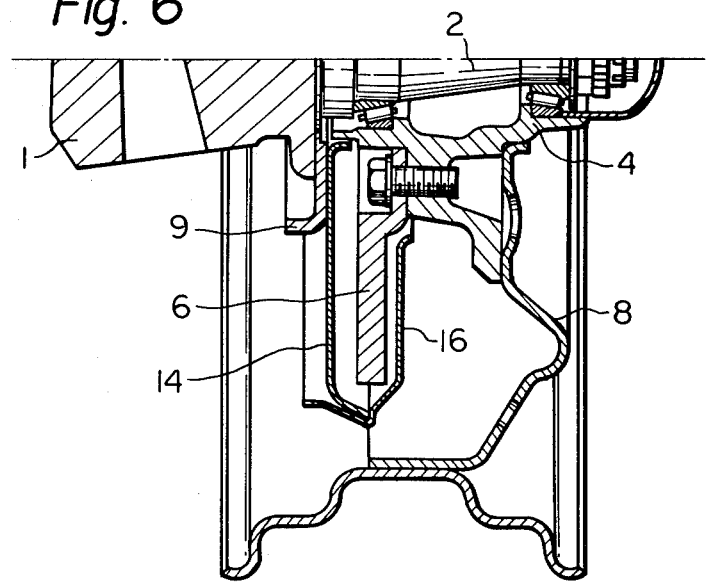
FIGS. 6 through 9 are cross-sectional views of still further embodiments of FIG. 1, respectively.
Figure 7:
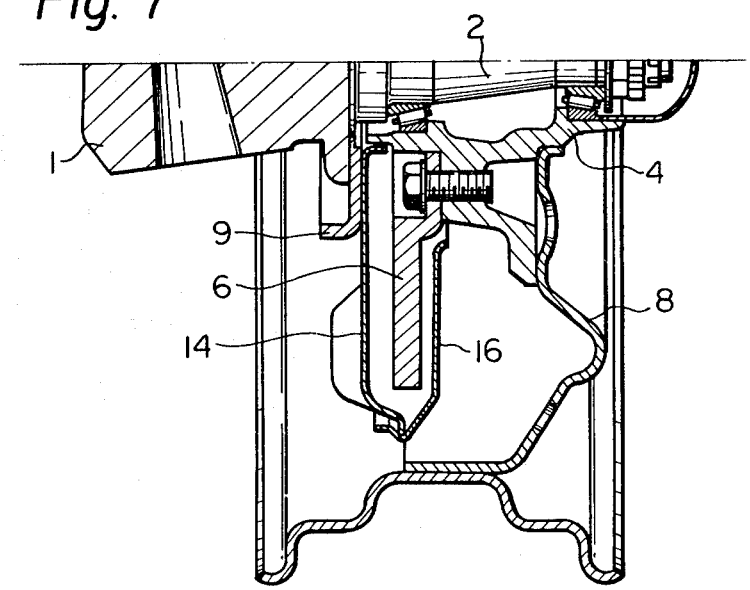
Figure 8:
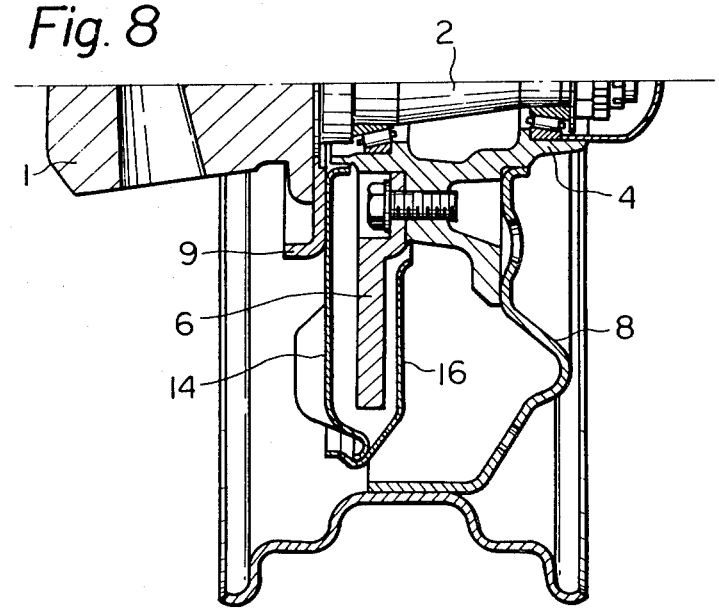

FIG. 4 shows a cover 16' in which, in order to more easily attach and remove the cover 16' as compared with that of the cover 16 shown in FIGS. 1 through 3, the annular face of the cover 16' is formed in a conical shape. Furthermore, by utilizing the conically-shaped cover 16', a considerably effective rust preventive action can be obtained.

Figure 9:
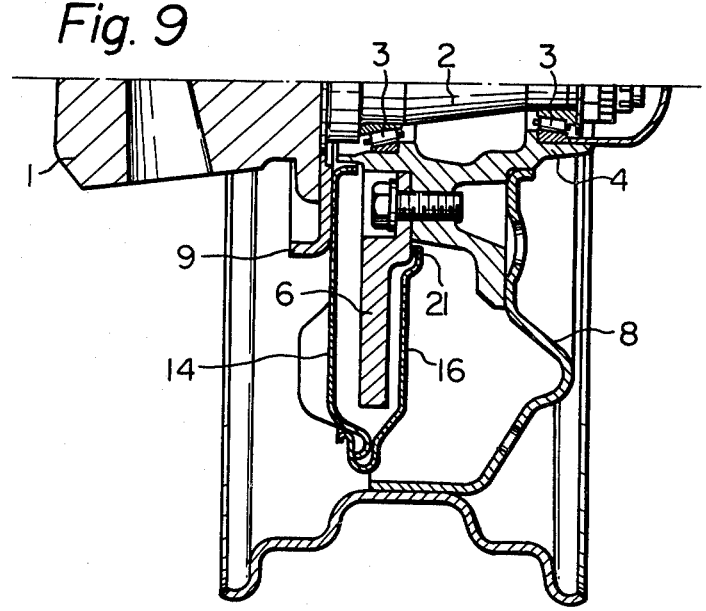
Figure 10:
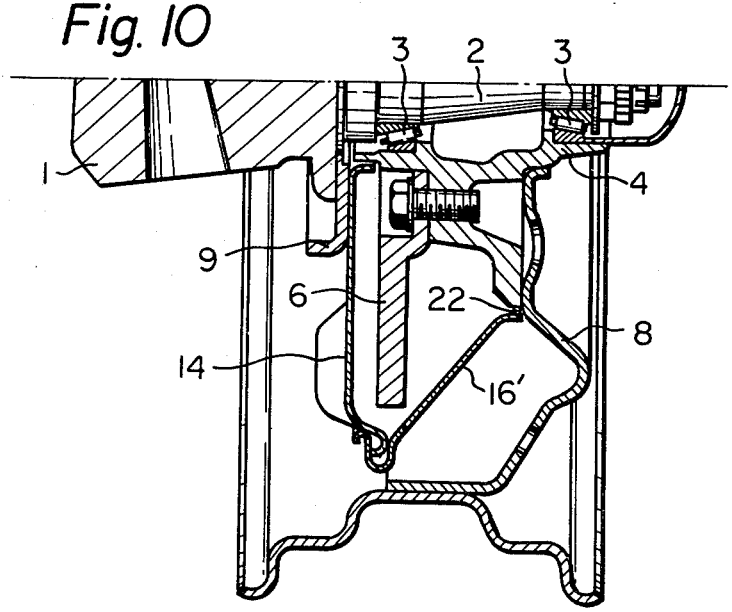
FIG. 10 is a cross-sectional view of another embodiment of FIG. 4.

FIG. 9 shows a cover 16 in which a sealing member 21 comprising felt or paper is attached to the inner peripheral end of the cover 16, thereby isolating the inside of the cover 16 from the atmosphere. FIG. 10 shows a cover 16' in which a sealing member 22 is also attached to the inner peripheral end of the cover 16', thereby shielding the inside of the cover 16' from the atmosphere. The embodiments shown in FIGS. 9 and 10 both exhibit an extremely effective rust preventive action.

FIGS. 5 through 8 show various methods for fixing the shield 16 or 16' onto the dust cover 14. Although FIGS. 5 thru 8 are not described, it is apparent from these Figures that the outer periphery of the dust shield 14 and the outer peripheral portion of the cover 16 fitted onto said outer periphery of said dust shield 14 in a snapping manner may be formed according to various shapes.

Since the cover 16 or 16' according to the present invention is supported on the dust shield 14, one can drive a vehicle with the cover 16 or 16' left attached onto the disc brake. At the present time, much of the transportation of vehicles is carried out by using ships, railways or trucks, and even if the vehicle itself is driven for the purpose of transporting the vehicle, the vehicle is driven only for an extremely short distance as in the case where the vehicle is transshipped from a ship to a railway. Thus, during this short period of transshipment, since the rotor 6 is scarcely heated, no mechanical problem occurs even though the rotor 6 is enclosed with the cover 16 or 16'.

According to the present invention, it is possible to keep the rotor from rusting during the time of transit by providing an easily attachable and removable rust preventing cover which can be manufactured at a low cost and with a light weight.

What is claimed is:

1. In an automotive disc brake system comprising a rotor and a permanent stationary dust shield, said rotor having an outer surface adapted to be exposed to the roadway and an inner surface opposite to said outer surface, and said dust shield covering said outer surface of said rotor and having an outer periphery extending radially beyond an outer periphery of said rotor, the improvement comprising prior to normal use of said brake system, a flexible, disposable, paper cover means for partially shielding said rotor surfaces from the atmosphere and preventing rusting of said rotor surfaces, wherein said cover means comprises a flat annular-shaped portion facing the inner surface of said rotor, an outer peripheral portion snapping onto the outer periphery of said dust shield, and is adapted for easy removal prior to normal use of said brake system.

2. An automotive disc brake system as in claim 1, the improvement further comprising said cover means containing a volatile rust preventive therein.

* * * * *

UNITED STATES PATENT AND TRADEMARK OFFICE
CERTIFICATE OF CORRECTION

PATENT NO. : 4,207,971
DATED : June 17, 1980
INVENTOR(S) : Masakazu ISHIKAWA, et al.

It is certified that error appears in the above–identified patent and that said Letters Patent are hereby corrected as shown below:

Column 3, line 22, "dust cover 14." should read -- dust shield 14. --.

Signed and Sealed this

Nineteenth Day of August 1980

[SEAL]

Attest:

SIDNEY A. DIAMOND

Attesting Officer

Commissioner of Patents and Trademarks